United States Patent
Westman

[11] Patent Number: 5,453,882
[45] Date of Patent: Sep. 26, 1995

[54] VIEWING DEVICE

[76] Inventor: William A. Westman, 29 East Street, Casino, NSW, Australia

[21] Appl. No.: 945,012

[22] Filed: Sep. 15, 1992

[30] Foreign Application Priority Data

Sep. 16, 1991 [AU] Australia .................... PK8391

[51] Int. Cl.⁶ ................ G02B 7/18; B60R 1/04
[52] U.S. Cl. .............. 359/855; 359/857; 359/863; 359/872; 359/881; 248/476; 362/83.1; 362/135; 362/432
[58] Field of Search ................ 359/850, 854, 359/855, 857, 861, 862, 863, 865, 866, 871, 872, 881; 362/83.1, 135, 431, 432; 248/476, 479

[56] References Cited

U.S. PATENT DOCUMENTS

| | | | |
|---|---|---|---|
| 1,444,538 | 2/1923 | Crooks | 359/862 |
| 2,075,900 | 4/1937 | Jackson | 359/850 |
| 2,197,280 | 4/1940 | Topping | 359/861 |
| 2,374,956 | 5/1945 | Rubissow | 359/857 |
| 2,569,576 | 10/1951 | Ramme | 359/861 |
| 2,645,159 | 7/1953 | Darroch | 359/861 |
| 4,277,142 | 7/1981 | Gardner | 359/861 |
| 4,702,572 | 10/1987 | Cossey | 359/881 |
| 4,733,956 | 3/1988 | Erickson | 359/863 |
| 4,909,618 | 3/1990 | Gardner | 359/872 |

FOREIGN PATENT DOCUMENTS

| | | | |
|---|---|---|---|
| 0252073 | 11/1962 | Australia | 359/881 |
| 16138/92 | 5/1992 | Australia . | |
| 2575710 | 7/1986 | France | 359/857 |
| 1803363 | 6/1970 | Germany | 359/855 |
| 0649008 | 1/1951 | United Kingdom | 359/854 |
| WO90/12705 | 11/1990 | WIPO . | |

Primary Examiner—Ricky D. Shafer
Attorney, Agent, or Firm—Leydig, Voit & Mayer, Ltd.

[57] ABSTRACT

A viewing device is adapted to enable an observer in a vehicle to view an object located to the rear of the observer. The vehicle has a rear vision mirror. The device comprises a support adapted to be rigidly affixed to the vehicle and a reflecting means mounted on the support. The reflecting means is capable of cooperating with the rear vision mirror so as to provide an image of the object in the rear vision mirror.

8 Claims, 3 Drawing Sheets

VIEWING DEVICE

BACKGROUND OF THE INVENTION AND PRIOR ART

This invention relates to viewing devices. More particularly, though not exclusively, this invention concerns a viewing device capable of providing a clear picture of objects located behind an observer without the observer having to turn around in order to see these objects.

The invention is especially useful for viewing baby capsules, seats or the like during the driving of vehicles.

It is commonly known that under the law of many countries vehicles must be fitted with approved baby capsules or seats when carrying babies and children under a certain age. Baby capsules and seats are usually fitted to the back seat of the vehicle and undoubtedly are a life saving feature. However, the location of a capsule or seat, though aimed at safety of babies and children, may cause significant apprehension to the driver of the vehicle or car since he or she cannot see the child while driving. In order to see the child, the driver would have to stop the car or, alternatively, turn around while driving. The latter would represent a driving danger and may result in accidents and serious injuries.

The present invention seeks to overcome or at least substantially alleviate this problem and to provide a device which permits the viewing of objects located to the rear of an observer without the observer having to turn around in order to see these objects.

Although the present invention will be described herein in connection with baby capsules and seats, it will be appreciated that the invention may find many different applications.

SUMMARY OF THE INVENTION

In one broad form the present invention provides a viewing device adapted to enable an observer in a vehicle to view an object located to the rear of the observer, the vehicle having a rear vision mirror, the device comprising:

a support adapted to be rigidly affixed to the vehicle; and a reflecting means mounted on the support, the reflecting means capable of cooperating with the rear vision mirror so as to provide an image of the object in the rear vision mirror.

Preferably, the vehicle has a front area and a rear area and the observer is positioned in the front area while the object is positioned in the rear area of the vehicle.

The vehicle may further have a rear window and it is preferred that the support be fixed to the vehicle between the rear window and the rear vision mirror. Conveniently, the support comprises a lamina which is at least partially transparent so that it would not preclude the normal use of the rear vision mirror. The lamina may be manufactured from a plastic material such as clear perspex or the like. Preferably, the support includes an adjusting means to enable it to fit different types of vehicles.

Where the rear area of the vehicle includes a seat with a backrest, the support may in use extend in an upward direction from the backrest.

Where the vehicle has a ceiling and the support in use extends in an upward direction from the backrest to the ceiling, the support may be rigidly attached to the ceiling in a known manner (by fasteners, for example).

Preferably, the reflecting means comprises a mirror mounted on the support. Advantageously, the mirror is positioned on the support in such a way as to reflect the image of the object (which, as mentioned above, may be a baby capsule, seat or the like) in the rear vision mirror. It is preferred that the mirror be adjustable in such a way as to allow the image of the object to be seen in the rear vision mirror by observers of different height.

It should be appreciated that the reflecting means may comprise more than one mirror in situations where there is a plurality of objects to be seen by the observer; for example, a twin capsule, a capsule and seat, etc. In this embodiment, it is preferred that at least one mirror mounted on the support be capable of cooperating with the rear vision mirror so as to provide an image of the plurality of objects in the rear vision mirror.

It should also be appreciated that the vehicle may have more than one rear vision mirror. In this embodiment of the invention, it is preferred that the mirror mounted on the support be capable of cooperating with each rear vision mirror so as to provide an image of the object in each rear vision mirror.

In the embodiment having a plurality of reflecting means mounted on the support and a plurality of rear vision mirrors, it is preferred that each reflecting means be capable of cooperating with at least one rear vision mirror so as to provide an image of one or more of objects in at least said one rear vision mirror.

In situations when additional illumination is required or desirable, the reflecting means may further comprise a light adapted to illuminate the interior of the vehicle in the vicinity of the object so as to allow the image of the object to be seen by the observer at night. Beneficially, the light may be provided with an ON/OFF switch and may have a separate power source or, alternatively, be connected to a vehicle's battery in a known manner via, for example, a cigarette lighter.

BRIEF DESCRIPTION OF THE DRAWINGS

By way of example some preferred embodiments of the present invention will now be described with reference to the accompanying drawings, wherein.

DETAILED DESCRIPTION OF THE DRAWINGS

Figures 1, 4:
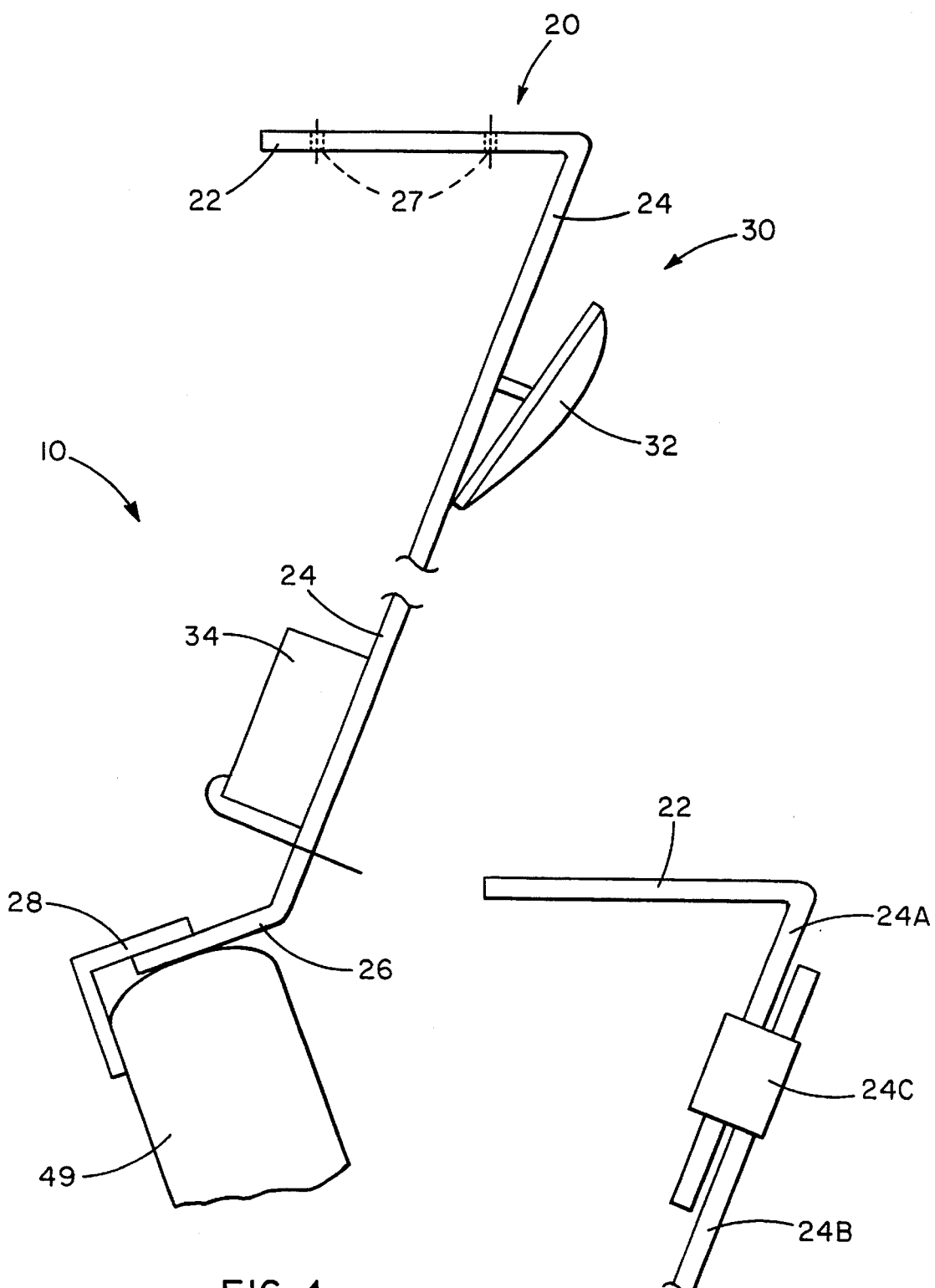
FIG. 1 is a side elevational view of an embodiment of a viewing device of the present invention.
FIG. 4 is a detailed view of the adjusting means of the device of FIG. 1, illustrating a variation of this embodiment.
Figure 2:
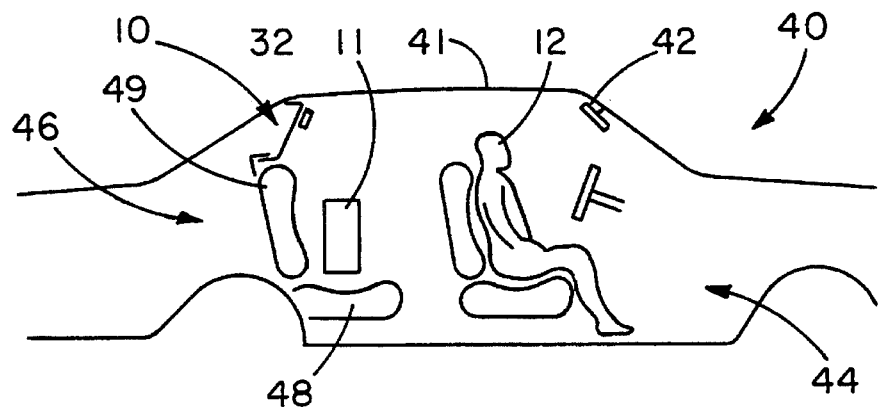
FIG. 2 is a side elevational view of the viewing device of FIG. 1 as installed in a vehicle.
Figure 3:
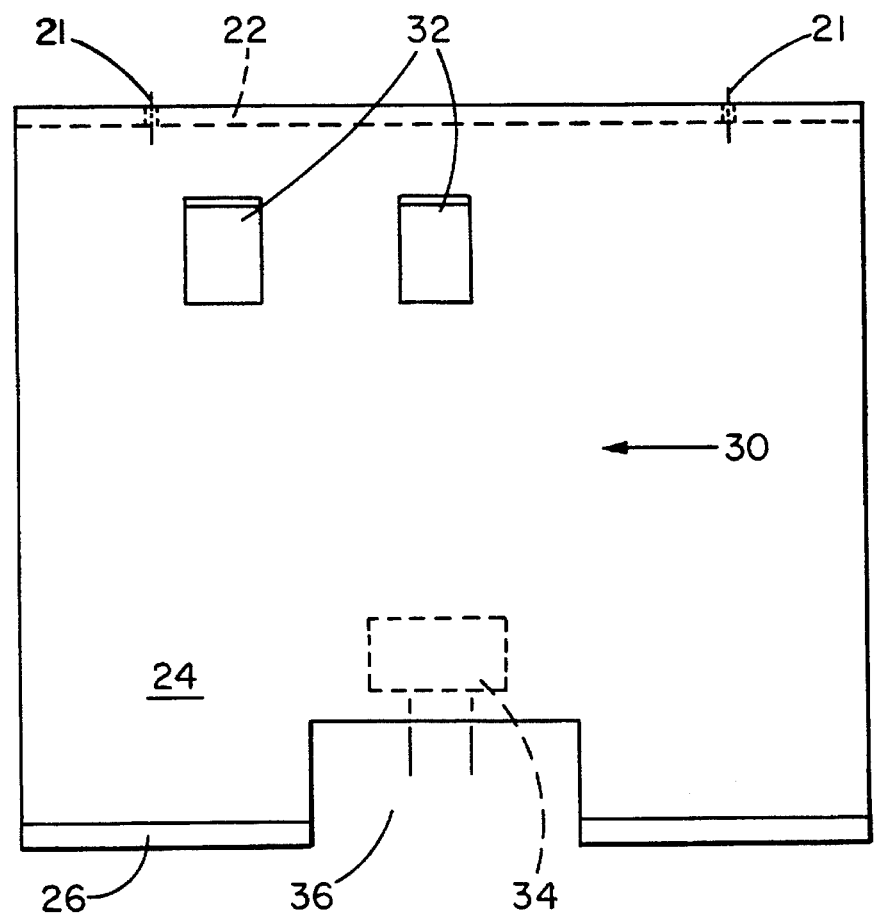
FIG. 3 is a front elevational view of the device in FIG. 1.

Referring to FIGS. 1 to 3, there is depicted viewing device 10 comprising support 20 and reflecting means 30. Vehicle 40, in which one preferred embodiment of device 10 is installed (see FIG. 2), has ceiling 41, rear vision mirror 42, front area 44 and rear area 46. Rear seat 48 having backrest 49 is positioned in rear area 46.

Support 20 is made from a sheet of clear perspex and comprises horizontal portion 22, inclined portion 24 and tail portion 26. Inclined portion 24 is shown in truncated form to reduce the dimensions of FIG. 1. Horizontal portion 22 is approximately 150 mm long, 500 mm wide and 5 mm thick. Horizontal portion 22 permits support 20 to be rigidly affixed to ceiling 41 by way of screws 21 in a known manner (also see FIGS. 3 and 4). Inclined portion 24, on which reflecting means 30 is mounted, is approximately 600 mm long, 500 mm wide and 5 mm thick. Tail portion 26 of approximately 100 mm length, 500 mm width and 5 mm thickness site on top of backrest 49 of vehicle 40 and is provided with tongue 28 which is permanently affixed to tail portion 26. Tongue 28 is generally an angled plate made of aluminium and serves to assist the correct placement of support 20 inside vehicle 40.

It should be appreciated that the dimensions of portions 22, 24 and 26 and the angle of inclination of portion 24 vary depending on the dimensions and type of the vehicle.

Referring now specifically to FIG. 3, reflecting means 30 comprises mirror 32 and light 34 (both are also shown in FIG. 1). Mirror 32 is mounted on support 20 by any suitable means and is positioned on support 20 in such a way as to reflect an image of object 11 (shown in FIG. 2), which is the baby capsule, seat or the like. Light 34 serves to illuminate the interior of vehicle 40 when necessary or desirable (for example, during night time driving) so as to allow better viewing of object 11 by observer 12. Light 34 is provided with an ON/OFF switch (not shown) connected to a vehicle's battery via a cigarette lighter and is operated by observer 12. Opening 36 is provided to accommodate electrical cords of light 34.

To operate device 10, object 11 is placed on rear seat 48 and secured, if desired, to rear seat 48 and/or backrest 49 in a suitable manner. Device 10 is placed on backrest 49 and secured to ceiling 41 in a manner previously described. In the situation where the vehicle has no ceiling or no suitable ceiling, device 10 is secured to backrest 49 only. Mirror 32 is then adjusted in such a way as to cooperate with rear vision mirror 42 to allow image of object 11 to be seen in rear vision mirror 42 by observer 12.

In order to accommodate different types of vehicles, inclined portion 24 of support 20 may include portions 24A and 24B and grip member 24C (see FIG. 4). To adjust device 10 to any vehicle having a suitable ceiling, portion 24A, which is integral with horizontal portion 22, is affixed to ceiling 41 while portion 24B is affixed to backrest 49 by sliding portions 24A and 24B until the appropriate fit is obtained. Grip member 24C, which is a clip or the like, serves to maintain portions 24A and 24B in place.

Figure 5:
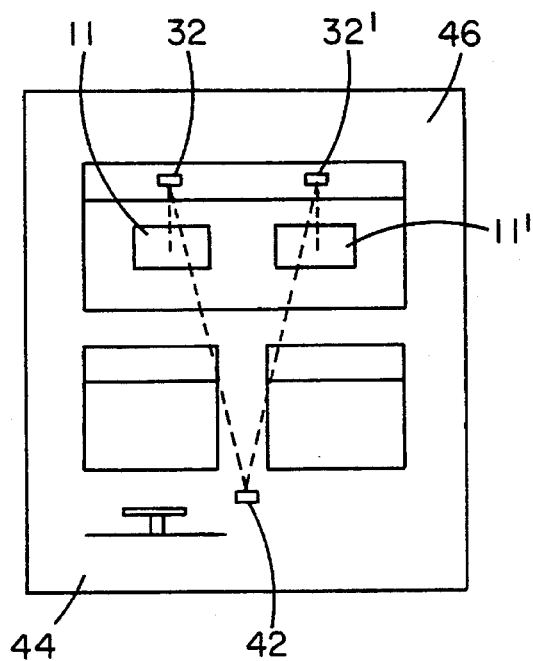
FIG. 5 is a schematic plan view of a second embodiment of the viewing device of the present invention.

To adjust device 10 to a vehicle having no ceiling, only portion 24B is required to be affixed to backrest 49. Referring now to FIG. 5, device 10 has two mirrors 32 and 32', each mirror cooperating with single rear vision mirror 42 to provide an image of both objects 11 and 11' in rear vision mirror 42.

Figure 6:
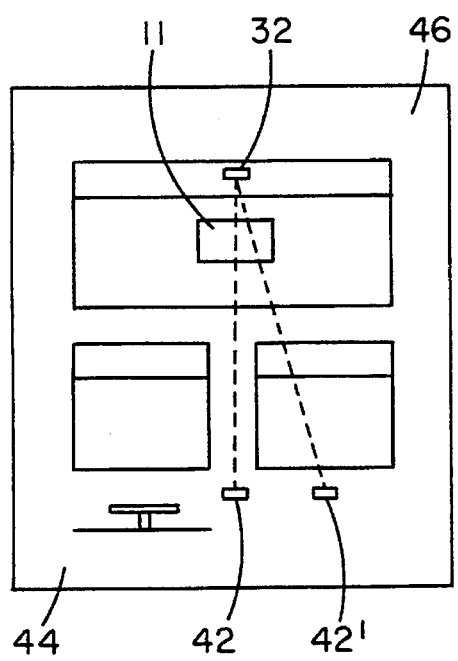
FIG. 6 is a schematic plan view of a third embodiment of the viewing device of the present invention.

Referring to FIG. 6, device 10 has mirror 32 cooperating with two rear vision mirrors 42 and 42' to provide an image of object 11 in both rear vision mirrors 42 and 42'.

Figure 7:
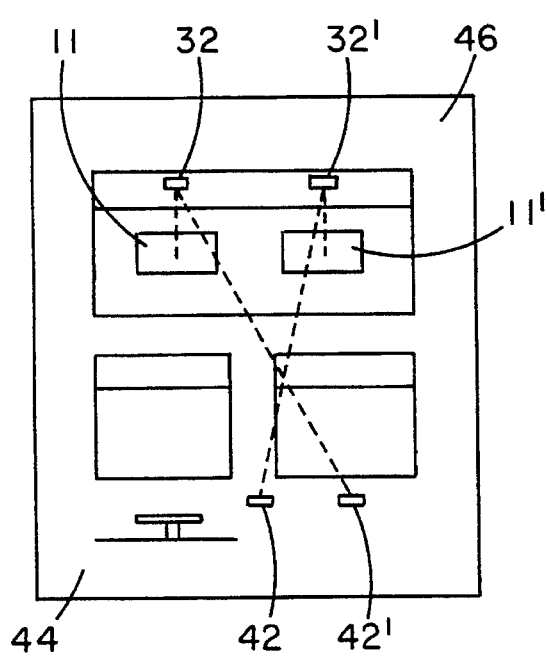
FIGS. 7 and 8 are schematic plan views of a fourth embodiment of the viewing device of the present invention.
Figure 8:
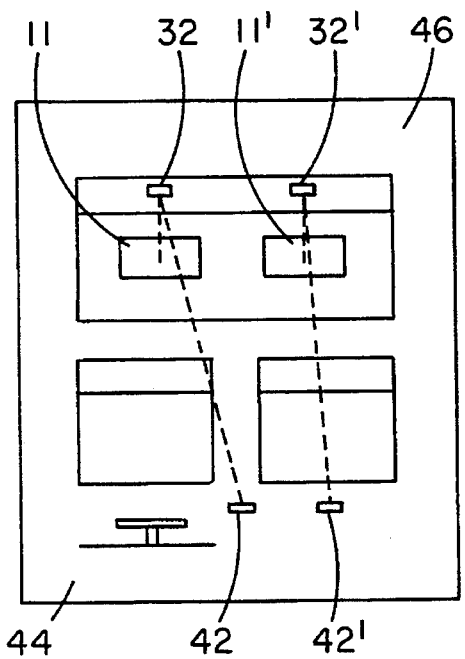

Referring to FIGS. 7 and 8, there is depicted device 10 has two mirrors 32 and 32' cooperating with two rear vision mirrors 42 and 42'. In FIG. 7, mirror 32 provides an image of object 11 in rear vision mirror 42', while mirror 32' provides an image of object 11' in rear vision mirror 42. In FIG. 8, mirror 32 provides an image of object 11 in rear vision mirror 42, while mirror 32' provides an image of object 11' in rear vision mirror 42'.

It will be appreciated that the viewing device of the present invention is a simple and effective solution to the existing problem.

It will be further appreciated that the preferred embodiment of the present invention disclosed herein is given by way of example only and is not intended to be limiting on the scope of the present invention. Other forms of the invention will be apparent to those skilled in the art and are not considered to be beyond the scope of the present invention.

I claim:

1. A viewing device disposed in a vehicle to enable an observer in the vehicle to view an object located inside the vehicle to the rear of the observer, the vehicle having inside therein a front area and a rear area, the observer being positioned in the front area and the object being positioned in the rear area, the rear area including a seat with a backrest, the vehicle further having a ceiling, a rear window and a rear vision mirror, the device comprising:

a support adapted to be rigidly affixed to the vehicle and to extend in an upward direction from the backrest to the ceiling, the support being rigidly affixed to the ceiling, the support being of a material which is at least partially transparent so as to permit rear vision from the rear vision mirror to the rear window, and a reflecting means mounted on the support, the reflecting means capable of cooperating with the rear vision mirror so as to provide an image of the object in the rear vision mirror.

2. The viewing device as claimed in claim 1, wherein the support comprises a lamina of clear perspex.

3. The viewing device as claimed in claim 1, wherein the reflecting means comprises a mirror positioned in such a way as to reflect the image of the object in the rear vision mirror.

4. The viewing device as claimed in claim 1, wherein the support further includes a light adapted to illuminate the object.

5. The viewing device as claimed in claim 1, wherein the support is adjustable so as to fit different types of vehicles and the reflecting means mounted on the support is adjustable so as to allow the image of the object to be seen in the rear vision mirror by observers of different height.

6. A viewing device disposed in a vehicle to enable an observer in the vehicle to view a plurality of objects located inside the vehicle to the rear of the observer, the vehicle having inside therein a front area and a rear area, the observer being positioned in the front area and the plurality of objects being positioned in the rear area, the rear area including a seat with a backrest, the vehicle further having a ceiling, a rear window and a rear vision mirror, the device comprising:

a support adapted to be rigidly affixed to the vehicle and to extend in an upward direction from the backrest to the ceiling, the support being rigidly affixed to the ceiling, the support being of a material which is at least partially transparent so as to permit rear vision from the rear vision mirror to the rear window, and a reflecting means mounted on the support, the reflecting means having at least one mirror capable of cooperating with the rear vision mirror so as to provide an image of the plurality of objects in the rear vision mirror.

7. A viewing device disposed in a vehicle to enable a plurality of observers in the vehicle to view an object located inside the vehicle to the rear of the observers, the vehicle having inside therein a front area and a rear area, each observer being positioned in the front area and the object being positioned in the rear area, the rear area including a seat with a backrest, the vehicle further having a ceiling, a rear window and a plurality of rear vision mirrors, the device comprising:

- a support adapted to be rigidly affixed to the vehicle and to extend in an upward direction from the backrest to the ceiling, the support being rigidly affixed to the ceiling, the support being of a material which is at least partially transparent so as to permit rear vision from each rear vision mirror to the rear window, and
- a reflecting means mounted on the support, the reflecting means having a mirror capable of cooperating with each rear vision mirror so as to provide an image of the object in each rear vision mirror.

8. A viewing device disposed in a vehicle to enable at least one observer in the vehicle to view a plurality of objects located inside the vehicle to the rear of that observer, the vehicle having inside therein a front area and a rear area, the observer being positioned in the front area and the plurality of objects is positioned in the rear area, the rear area including a seat with a backrest, the vehicle further having a ceiling, a rear window and a plurality of rear vision mirrors, the device comprising:

- a support adapted to be rigidly affixed to the vehicle and to extend in an upward direction from the backrest to the ceiling, the support being rigidly affixed to the ceiling, the support being of a material which is at least partially transparent so as to permit rear vision from each rear vision mirror to the rear window, and
- a plurality of reflecting means mounted on the support, each reflecting means capable of cooperating with at least one rear vision mirror so as to provide an image of one or more objects in at least said one rear vision mirror.

* * * * *